Nov. 19, 1929.      H. F. SCHECKER      1,736,764
ELECTRICAL CONDENSER AND METHOD FOR MAKING THE SAME
Filed Feb. 28, 1929

INVENTOR
*Henry F. Schecker*
BY
*Dean, Fairbank, Obright & Hirsch*
his ATTORNEYS.

Patented Nov. 19, 1929

1,736,764

UNITED STATES PATENT OFFICE

HENRY F. SCHECKER, OF BROOKLYN, NEW YORK, ASSIGNOR TO AEROVOX WIRELESS CORPORATION, A CORPORATION OF NEW YORK

ELECTRICAL CONDENSER AND METHOD FOR MAKING THE SAME

Application filed February 28, 1929. Serial No. 343,534. REISSUED

My present invention relates primarily to condensers of fixed capacity and to methods for producing the same.

As conducive to a clear understanding of the invention, it is noted that in the manufacture of condensers with paraffine wax or "halowax" impregnating medium, irregularities are apt to ensue due to the contraction of said medium, as it hardens upon cooling of the condenser after impregnation. As a consequence, the impregnating medium draws away particularly from the ends of the condenser, leaving air gaps which, of course, permit the conducting parts or armatures of the condenser to vibrate or hum in operation, with consequent heating, inefficiency, and decrease of life.

Paper wound condensers, in particular those of inductively wound type, commonly used for "B" eliminators, and prepared in conventional manner with paraffine wax or equivalent impregnating medium, commonly break down under routine inspection tests, so that large proportions thereof, have to be rejected.

An object of the invention is to provide a condenser of relatively constant capacity and small manufacturing cost that will withstand rigorous electrical tests, with a minimum of rejection.

Another object is to provide a process for producing a condenser of the above type and which may be easily executed with simple apparatus and ordinary technical precautions.

Another object is to provide a process of the above type, which does not require any reorganization in the construction or method of winding or otherwise assembling condensers of known construction, and which does not require any increase of the conventional size or change in the conventional shape of such condensers.

Figure 1:
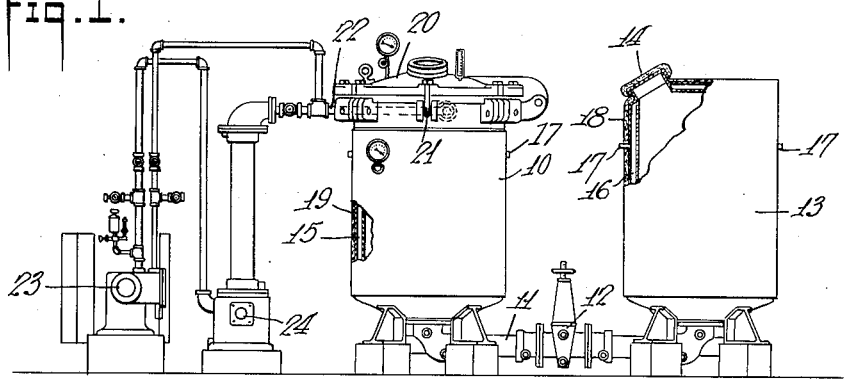
Figure 2:
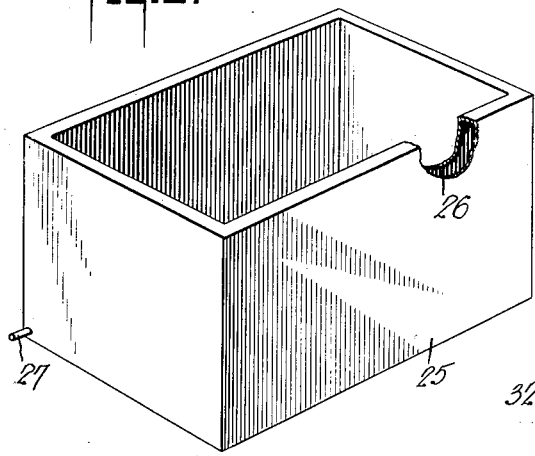
Figure 3:
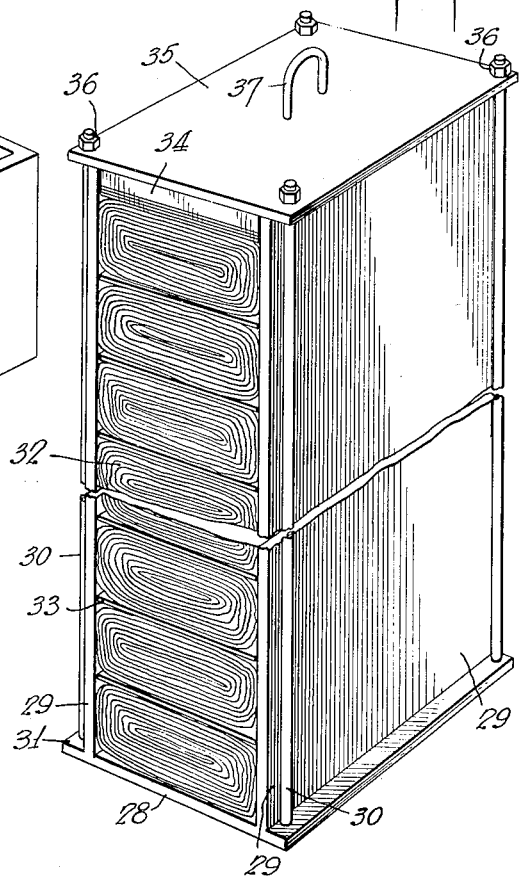
Figure 4:
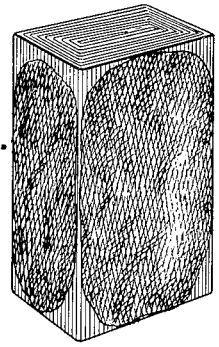

In the accompanying drawings in which is shown one of various possible embodiments of the several features of the invention, Fig. 1 is a sectional diagrammatic view of the impregnating vat and supply tank installation, Fig. 2 is a perspective view of the oil tank, Fig. 3 is a perspective view of a condenser clamp with condensers in place therein, and Fig. 4 is a perspective view showing the condenser resulting as a product of the process.

In connection with the accompanying drawings, showing the impregnating apparatus, I will now describe in detail my preferred process and product. The apparatus used preferably comprises an impregnating vat 10 communicating through a pipe 11 having a valve 12 therein, with a tank 13 containing the impregnating wax, which is admitted thereto through a manhole 14. Both the vat and the tank preferably have jackets 15 and 16 respectively, which are provided with nipples 17 for admission and escape of steam. Asbestos coats 18 and 19 maintain the heat respectively in the tank and the vat. The vat 10 preferably has a hinged cover 20 maintained hermetically sealed by means of hinged clamps 21. A pipe 22 leads to the interior of the vat near the top thereof for application of vacuum to the contents thereof. The vacuum is applied by a pump 23 and the moisture withdrawn from the vat by the vacuum pump is collected by condenser 24.

In addition to the foregoing installation, there is a rectangular box 25 of sheet metal, shown in Fig. 2, preferably having a hollow jacket 26 through which water may be circulated by admission through pipe 27 to cool the oil in which the condensers are soaked, after they have been impregnated with the impregnating wax.

The present process is particularly applicable to paper wound condensers of familiar type. Preferably the condensers are mounted in clamps as shown best in Fig. 3. Each clamp comprises a rectangular metal base plate 28 having unitary therewith a pair of upstanding side walls 29 and upstanding bolts 30 near the corners of said base plate, rising upward from the ledge 31 thereof, beyond the side walls. The individual wound condensers 32 taken from the winding machine may first be dried in a vacuum dryer, although this step is not essential. The condensers are then stacked, alternating one of these condensers and an intervening thin metal plate 33 fitting between the side walls 29. One or more top plates 34 are then superposed to fit between the side plates 29. Thereupon a thick cover plate 35 is laid over the top edges of the side walls 29 through which pressure is applied upon the intervening pile by tightening nuts 36 upon the upper extremities of the bolts 30.

A series of the condenser clamp assemblies of Fig. 3 is disposed within the vat 10 and there heated, steam being circulated about jacket 15 for this purpose by way of the nipples 17 thereof. With the flow of steam through the jacket 15 continued, vacuum is now applied through pipe 22 until the condensers are entirely free from moisture.

Cover 20 being sealed, valve 12 is now opened to admit the impregnating medium from tank 13 into the vat 10, the latter being kept under vacuum, thus causing travel of the impregnating wax by gravity flow and suction combined. The vacuum is maintained and steam heat applied to the vat for a period of time sufficient to thoroughly saturate the paper in the condensers with impregnating wax. If desired, the vacuum pump may be reversed during part or all of this step to exert pressure upon the impregnating medium. Thereupon, the condensers are allowed slowly to cool in the vat, to a temperature slightly higher than the melting point of the wax used. At that temperature, the individual clamp assemblies are removed from vat 10, by lifting them by means of a suitable implement inserted through eye 37 and immediately thereafter submerging the clamp assembly in the oil tank 25. Tank 25 has a charge, preferably of oil having high dielectric strength, non-hygroscopic and free from moisture. Many oils used for lubricating turbines and Diesel engines are suitable as are also transformer oils. Other dielectrics liquid at ordinary or room temperatures and having the foregoing properties may be employed, although oil is ordinarily preferred. The condensers are left in the oil until they are cold, usually for about four and one-half to five hours. Thereupon, the individual condenser units are removed by disassembly of the clamps. The condenser units are now ready for test and subsequent assembly to make up the commercial equipment.

By my process, the impregnating medium completely fills all interstices in the condenser, the latter having been voided of air and moisture. The compressed condenser is removed from the vat while still hot and before the wax has contracted to such extent as to allow any air to be admitted between the turns or layers of the condensers. The subsequent cooling, hardening and contraction of the wax under oil can only result in drawing oil into the interstices to satisfy the vacuum, so that air is thereby permanently excluded from the condenser.

The entire dielectric space between the conducting convolutions or layers of the condenser, including the pores of the paper winding, is thus completely filled with high dielectric impregnating wax, throughout the major area thereof, and with oil dielectric at the corners and edges, as shown.

Fig. 4 indicates the structure of the condenser unit, largely conventionally and without regard to scale or proportions. The main volume of the condenser has wax dielectric as suggested by the dark cross-hatching. The paler cross hatching at the corner and edges indicates the position of the oil dielectric which completely fills the gaps left vacant by the contraction of the wax.

By actual experience, my oil impregnating process results in reducing the rejections of inductively wound condensers for "B" eliminator purposes particularly, from about 40 to 60 per cent to about 2 to 3 per cent. The productiveness of the manufacturing plant is thus improved between 20 and 30 times, that is, from 2,000 to 3,000 per cent. Tests also show much greater constancy of dielectric capacity over a period of time and under varying temperature conditions, as compared with condensers impregnated merely in wax. Moreover, the oil treatment renders the wax dielectric less brittle.

It will thus be seen that there is herein described a process and product in which the several features of this invention are embodied, and which process and product in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. The process of treating a condenser body which consists in impregnating the same in heated impregnating wax, removing the body and immersing the same before the wax has hardened, in liquid mineral oil, and cooling the body while so immersed, whereby the mineral oil will follow up the wax as it cools and prevent the formation of voids within the body.

2. A condenser including a body containing porous insulation and impregnated with wax throughout the greater portion of the body thereof and impregnated further with fluid mineral oil throughout the remaining portion of the body, said body being free from voids and having all interstices filled with impregnating compound.

3. The method of impregnating paper wound condensers, which consists in subjecting said condensers to clamping pressure, applying steam heat under vacuum, immersing the clamped condensers in a heated impregnating medium which is hard at ordinary temperatures, and then immersing the heated impregnated condensers in another impregnating medium having a lower melting point.

4. The method of impregnating paper wound condensers, which consists in subjecting said condensers to clamping pressure, applying steam heat under vacuum, immersing the clamped condensers in a heated impregnating medium, which is hard at ordinary temperatures, allowing the condensers to cool to a temperature little above the melting point of the medium, and then immersing the still warm impregnated condensers in another impregnating medium having a lower melting point.

Signed at Brooklyn in the county of Kings and State of New York this 26th day of February A. D. 1929.

HENRY F. SCHECKER.